(12) United States Patent
Crompton et al.

(10) Patent No.: US 8,398,122 B2
(45) Date of Patent: Mar. 19, 2013

(54) PUSH CONNECT JOINT ASSEMBLY, SYSTEM AND METHOD

(75) Inventors: David B. Crompton, Tiverton, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 13/246,597

(22) Filed: Sep. 27, 2011

(65) Prior Publication Data
US 2012/0169039 A1    Jul. 5, 2012

Related U.S. Application Data

(63) Continuation-in-part of application No. 12/981,855, filed on Dec. 30, 2010, now Pat. No. 8,210,576.

(60) Provisional application No. 61/473,418, filed on Apr. 8, 2011.

(51) Int. Cl.
*F16L 21/02* (2006.01)
(52) U.S. Cl. .................. 285/340; 285/315; 29/521
(58) Field of Classification Search .......... 285/340, 285/315, 307, 308; 29/521
See application file for complete search history.

(56) References Cited

U.S. PATENT DOCUMENTS

| | | | |
|---|---|---|---|
| 1,822,056 A | 9/1931 | Noble | |
| 2,456,203 A | 12/1948 | Loepsinger | |
| 3,140,107 A | 7/1964 | Hynes | |
| 3,365,219 A | 1/1968 | Nicolaus | |
| 3,679,241 A | 7/1972 | Hoffmann | |
| 4,123,090 A | 10/1978 | Kotsakis et al. | |
| 4,146,254 A * | 3/1979 | Turner et al. | 285/340 |
| 4,178,023 A | 12/1979 | Guest | |
| 4,220,361 A | 9/1980 | Brandenberg | |
| 4,288,113 A * | 9/1981 | Saulnier | 285/308 |
| 4,305,606 A | 12/1981 | Legris | |
| 4,440,424 A | 4/1984 | Mode | |
| 4,508,369 A | 4/1985 | Mode | |
| 4,613,172 A | 9/1986 | Schattmaier | |
| 4,630,848 A | 12/1986 | Twist et al. | |
| 4,637,640 A | 1/1987 | Fournier et al. | |
| 4,645,246 A * | 2/1987 | Guest | 285/307 |
| 4,685,706 A | 8/1987 | Kowal et al. | |
| 4,802,696 A | 2/1989 | Chohan et al. | |
| 4,895,395 A | 1/1990 | Ceriani | |
| 4,919,457 A | 4/1990 | Moretti | |
| 5,024,468 A | 6/1991 | Burge | |
| 5,084,954 A | 2/1992 | Klinger | |
| 5,160,179 A | 11/1992 | Takagi | |
| 5,230,539 A | 7/1993 | Olson | |

(Continued)

FOREIGN PATENT DOCUMENTS

DE    4304241    8/1994
EP    272988    6/1988

(Continued)

OTHER PUBLICATIONS

Cash ACME, Sharkbite(R) Push Fittings: A Connection System for Copper, CPVC or PEX pipe, Dec. 6, 2006. U.S.

*Primary Examiner* — David E Bochna
(74) *Attorney, Agent, or Firm* — Williams Mullen PC; Thomas F. Bergert

(57) ABSTRACT

A push fitting joint packaging arrangement allows the re-use and repair of push-to-connect fittings and valves without damage to the fitting or valve elements or the pipe, and without coining, gluing or threaded engagement of parts. In one embodiment of the present invention, the arrangement comprises a split fastening ring and a split O-ring support member.

18 Claims, 17 Drawing Sheets

U.S. PATENT DOCUMENTS

| | | |
|---|---|---|
| 5,284,582 A | 2/1994 | Yang |
| 5,292,157 A | 3/1994 | Rubichon |
| 5,487,572 A | 1/1996 | Combot-Courrau et al. |
| 5,577,530 A | 11/1996 | Condon |
| 5,603,532 A * | 2/1997 | Guest ........................... 285/340 |
| 5,711,550 A | 1/1998 | Brandt |
| 5,722,696 A | 3/1998 | Taneya |
| 5,769,462 A | 6/1998 | Angell |
| 5,887,911 A | 3/1999 | Kargula |
| 5,911,443 A | 6/1999 | Le Quere |
| 5,957,509 A | 9/1999 | Komolrochanaporn |
| 5,983,917 A | 11/1999 | Thomas |
| 6,145,887 A | 11/2000 | Cambot-Courrau |
| 6,174,002 B1 | 1/2001 | Rho |
| 6,357,802 B1 | 3/2002 | Nazato et al. |
| 6,447,019 B1 | 9/2002 | Hosono et al. |
| 6,517,124 B1 | 2/2003 | Le Quere |
| 6,578,879 B2 | 6/2003 | Muto |
| 6,612,623 B2 | 9/2003 | Salomon-Bahls |
| 6,685,230 B1 | 2/2004 | Bottura |
| 6,764,102 B2 | 7/2004 | Ezura |
| 6,824,172 B1 | 11/2004 | Komolrochanaporn |
| 6,869,109 B2 | 3/2005 | Matsushita |
| 6,979,026 B2 | 12/2005 | Kasahara et al. |
| 7,195,287 B2 | 3/2007 | Wai |
| 7,273,235 B2 | 9/2007 | Conquard et al. |
| 7,316,429 B2 * | 1/2008 | Viegener ....................... 285/340 |
| 7,380,836 B2 | 6/2008 | Bogdanowicz et al. |
| 7,448,654 B2 | 11/2008 | Le Quere |
| 7,475,913 B2 | 1/2009 | Muto |
| 7,509,971 B2 | 3/2009 | Kajuch |
| 7,530,606 B1 | 5/2009 | Yang |
| 7,621,569 B2 | 11/2009 | Anthoine |
| 7,644,955 B1 * | 1/2010 | Komolrochanaporn ...... 285/340 |
| 7,850,208 B2 | 12/2010 | Greenberger |
| 7,862,089 B2 | 1/2011 | Crompton |
| 7,914,050 B2 | 3/2011 | Udhöfer et al. |
| 8,205,915 B1 * | 6/2012 | Crompton et al. ............ 285/340 |
| 2003/0057701 A1 * | 3/2003 | Koo ............................. 285/307 |
| 2004/0070198 A1 | 4/2004 | Rohrig |
| 2004/0245766 A1 | 12/2004 | Vallee |
| 2007/0075542 A1 | 4/2007 | Glaze et al. |
| 2010/0253064 A1 | 10/2010 | Le Quere |
| 2011/0101685 A1 | 5/2011 | Lai |

FOREIGN PATENT DOCUMENTS

| | | |
|---|---|---|
| EP | 1521027 | 4/2005 |
| EP | 2256394 | 1/2010 |
| GB | 2146400 | 4/1985 |
| GB | 2328259 | 2/1999 |
| JP | 2001032984 | 2/2001 |
| WO | 99/39124 | 8/1999 |
| WO | 0079173 | 12/2000 |

* cited by examiner

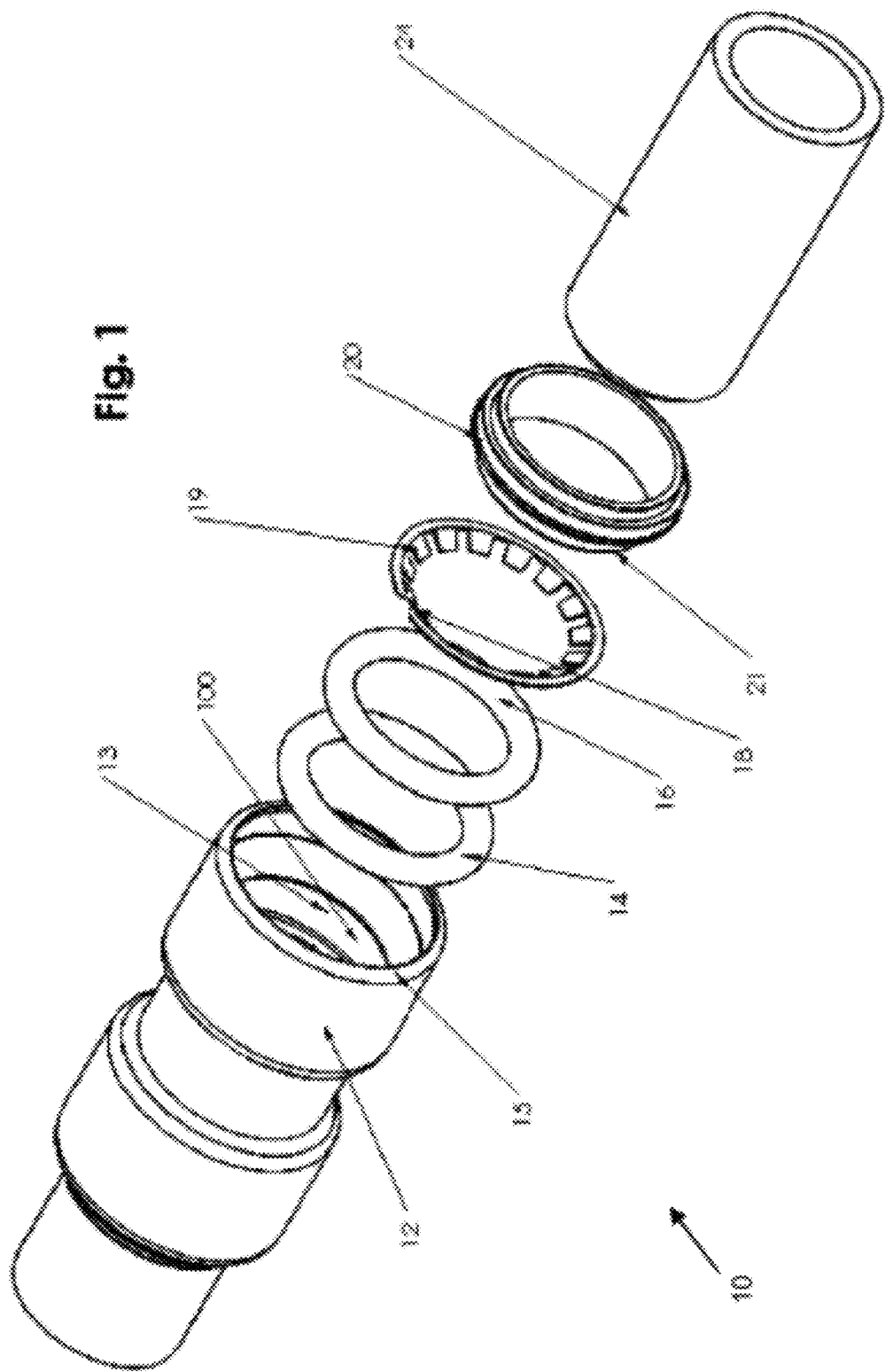

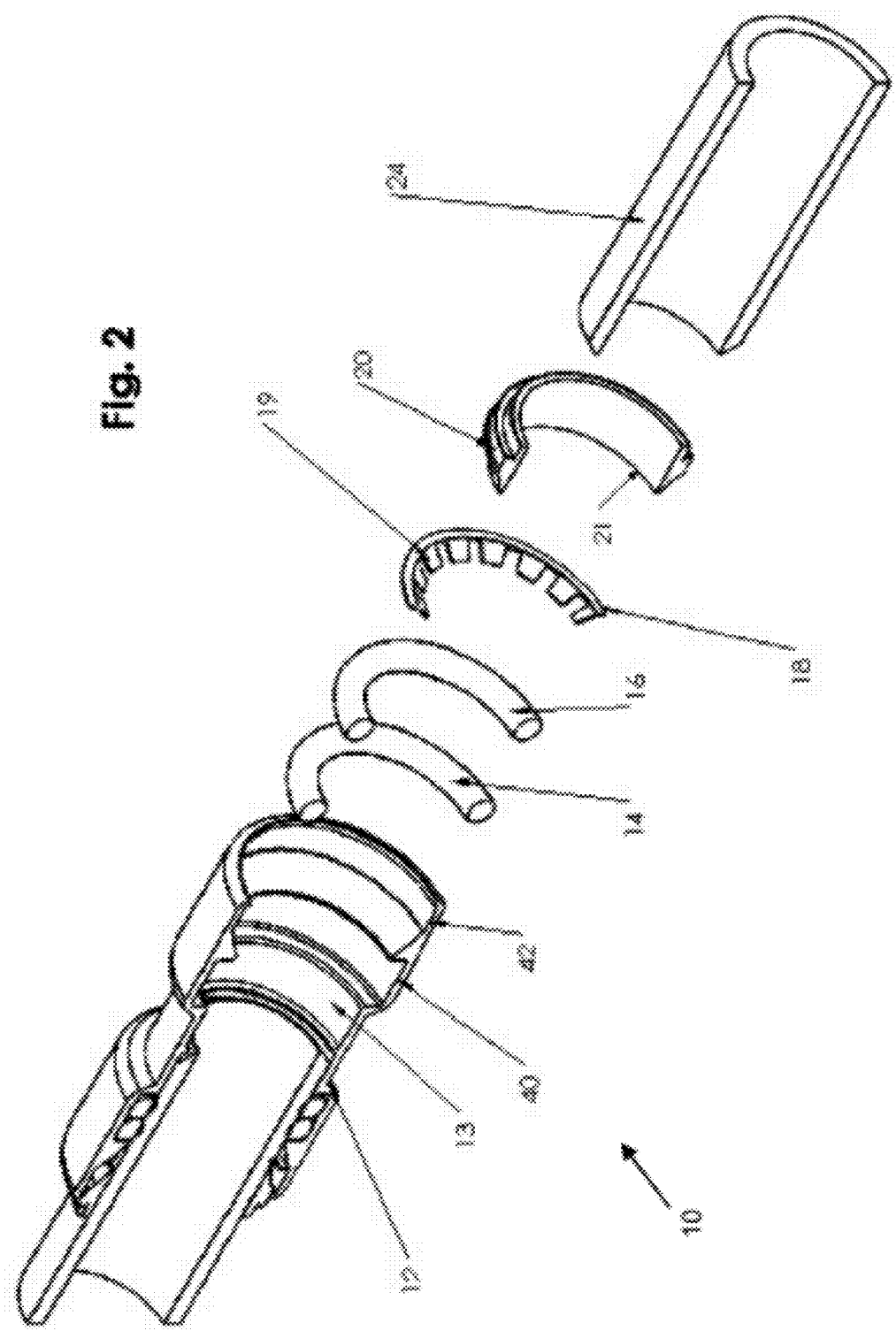

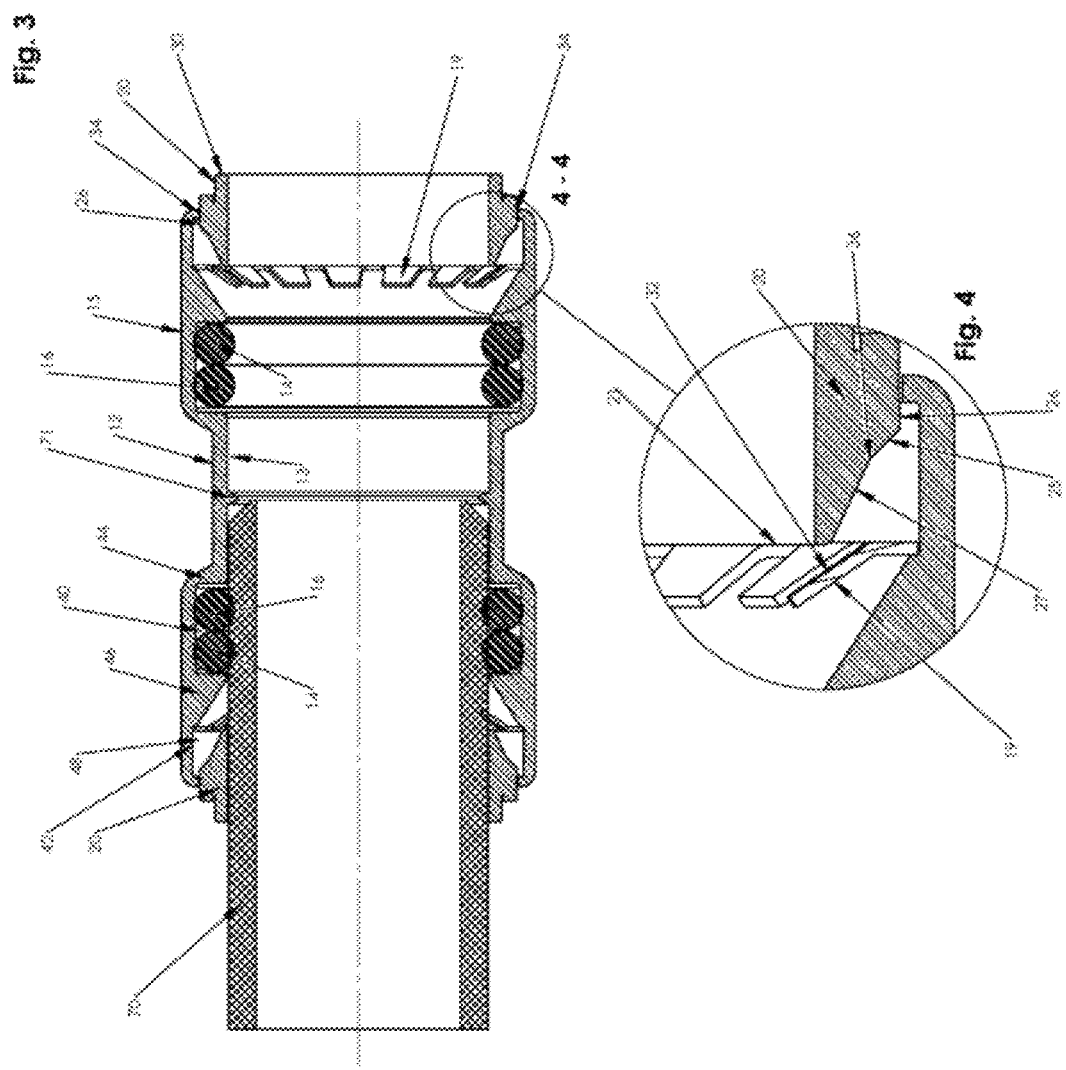

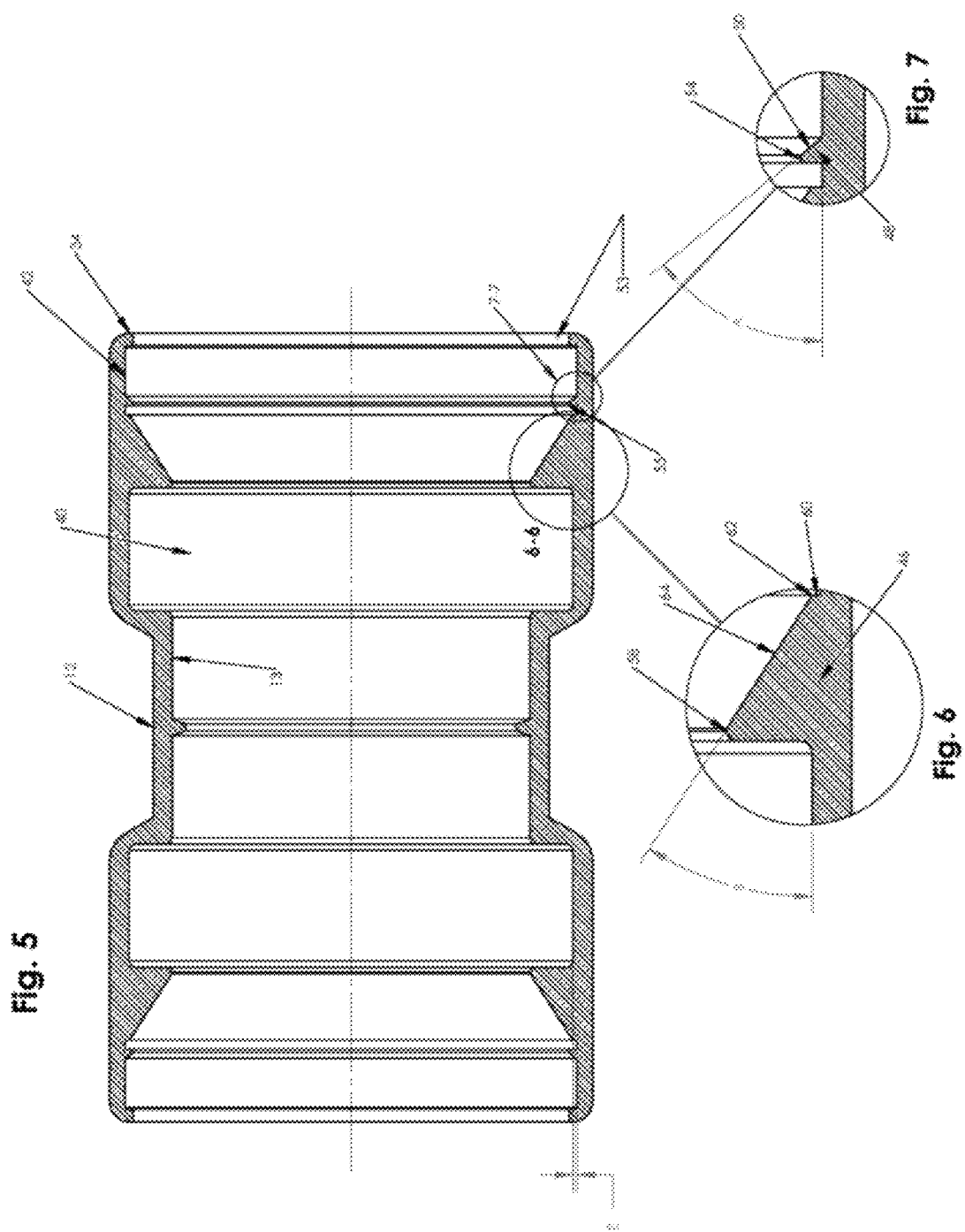

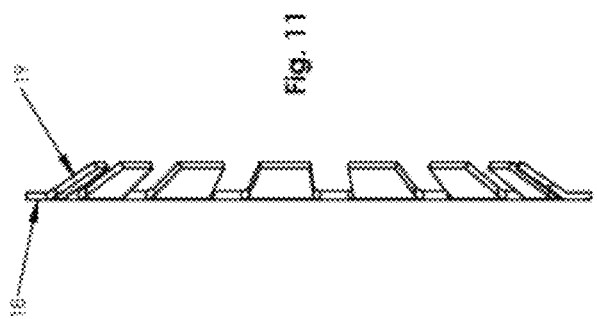
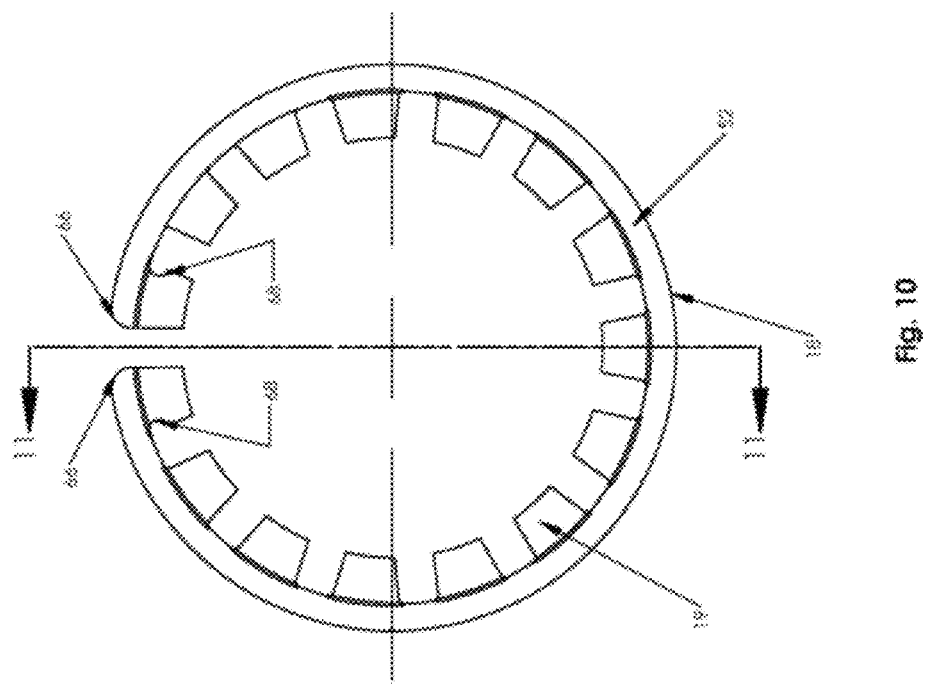
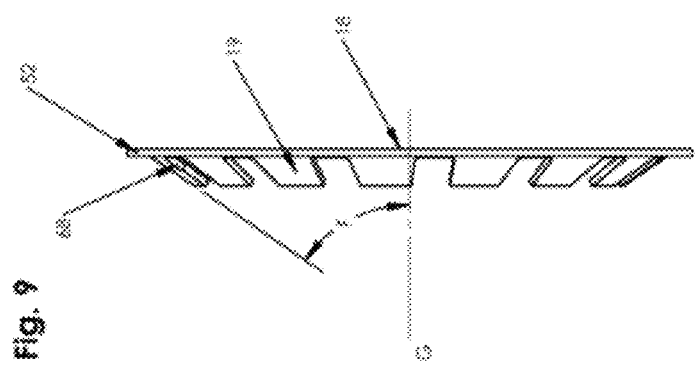

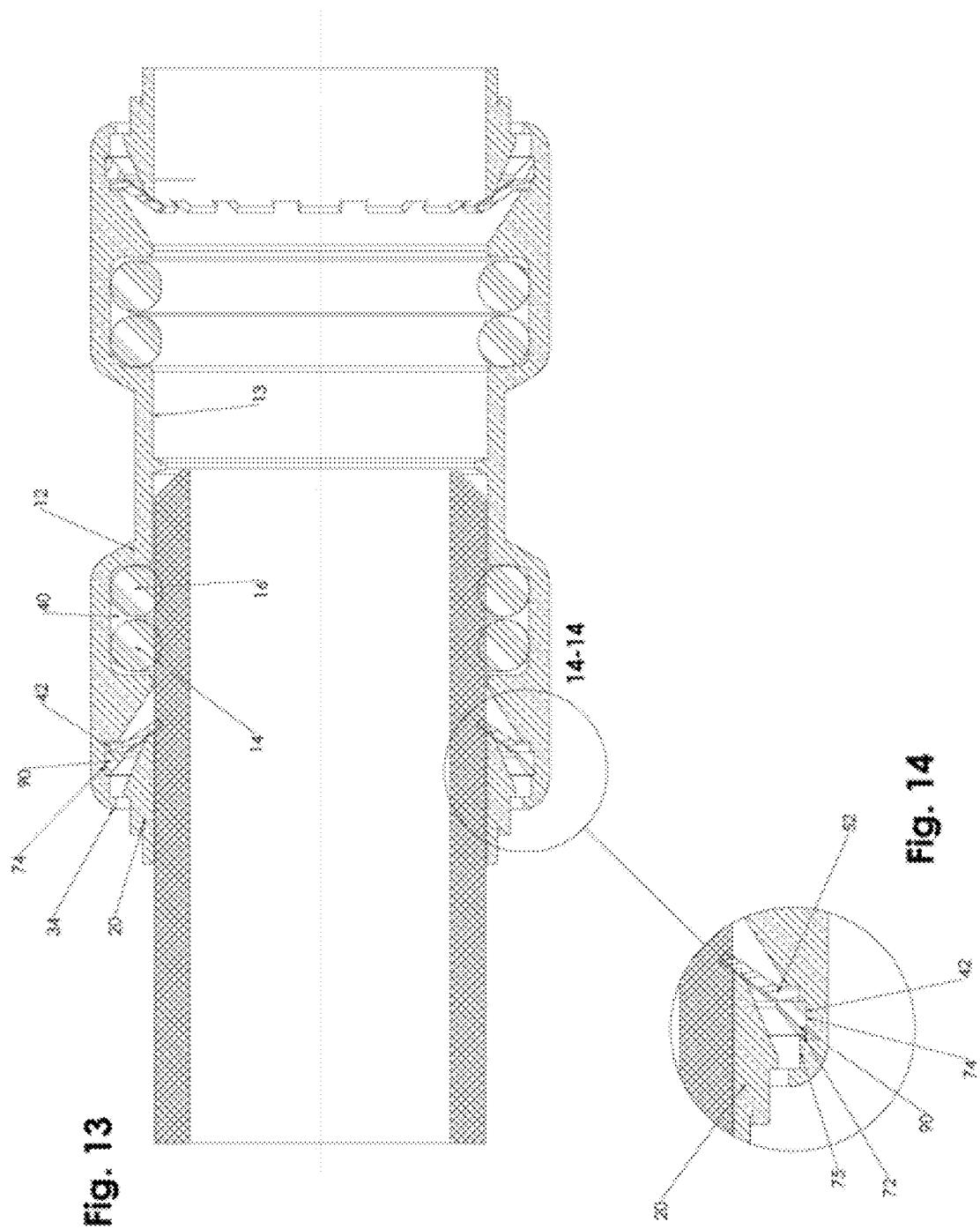

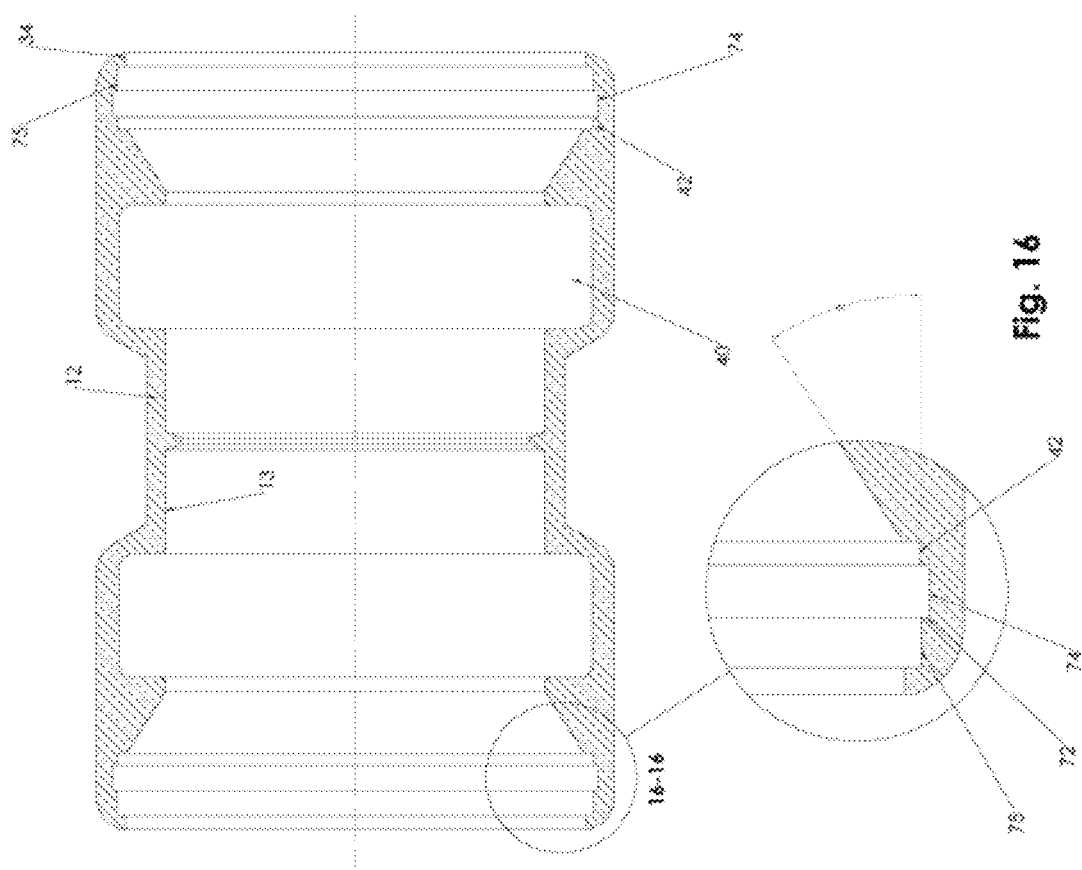

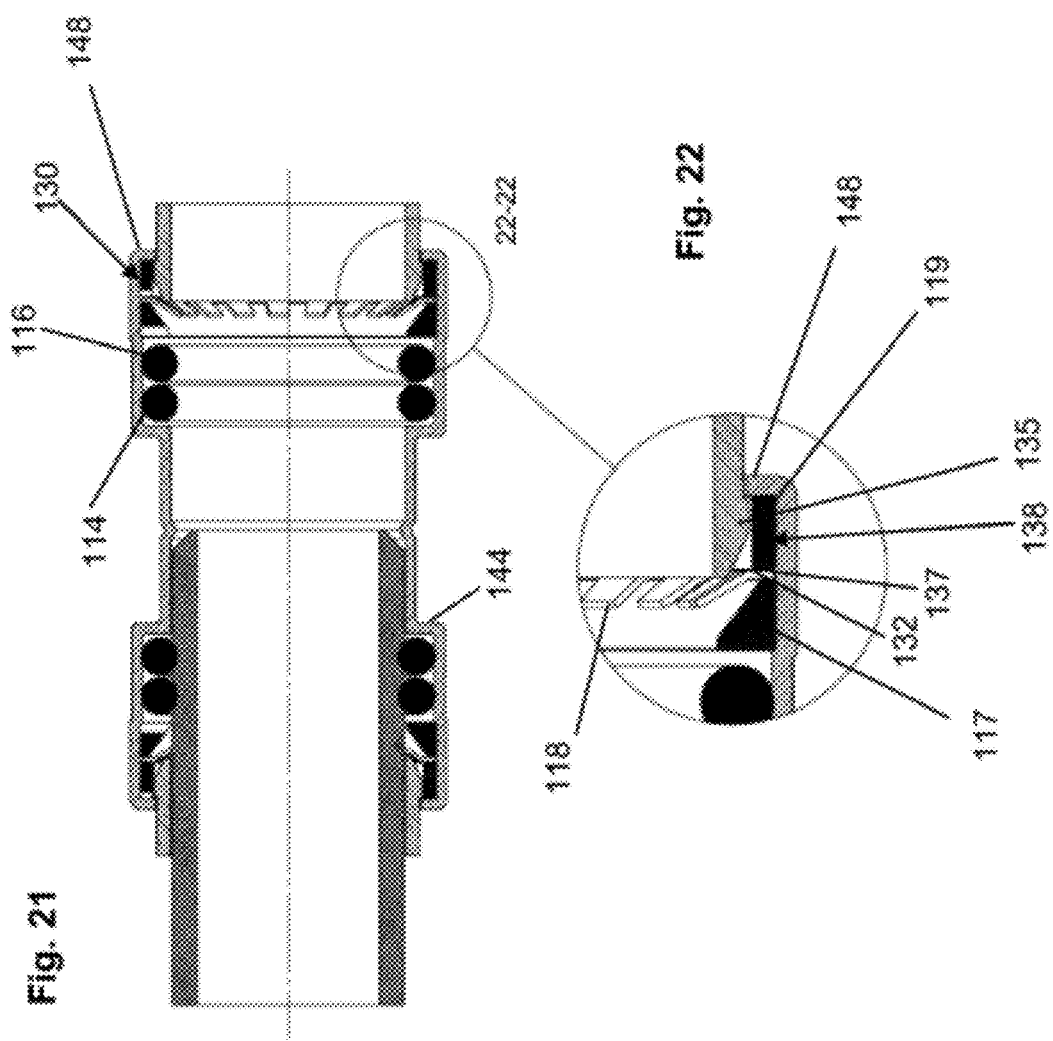

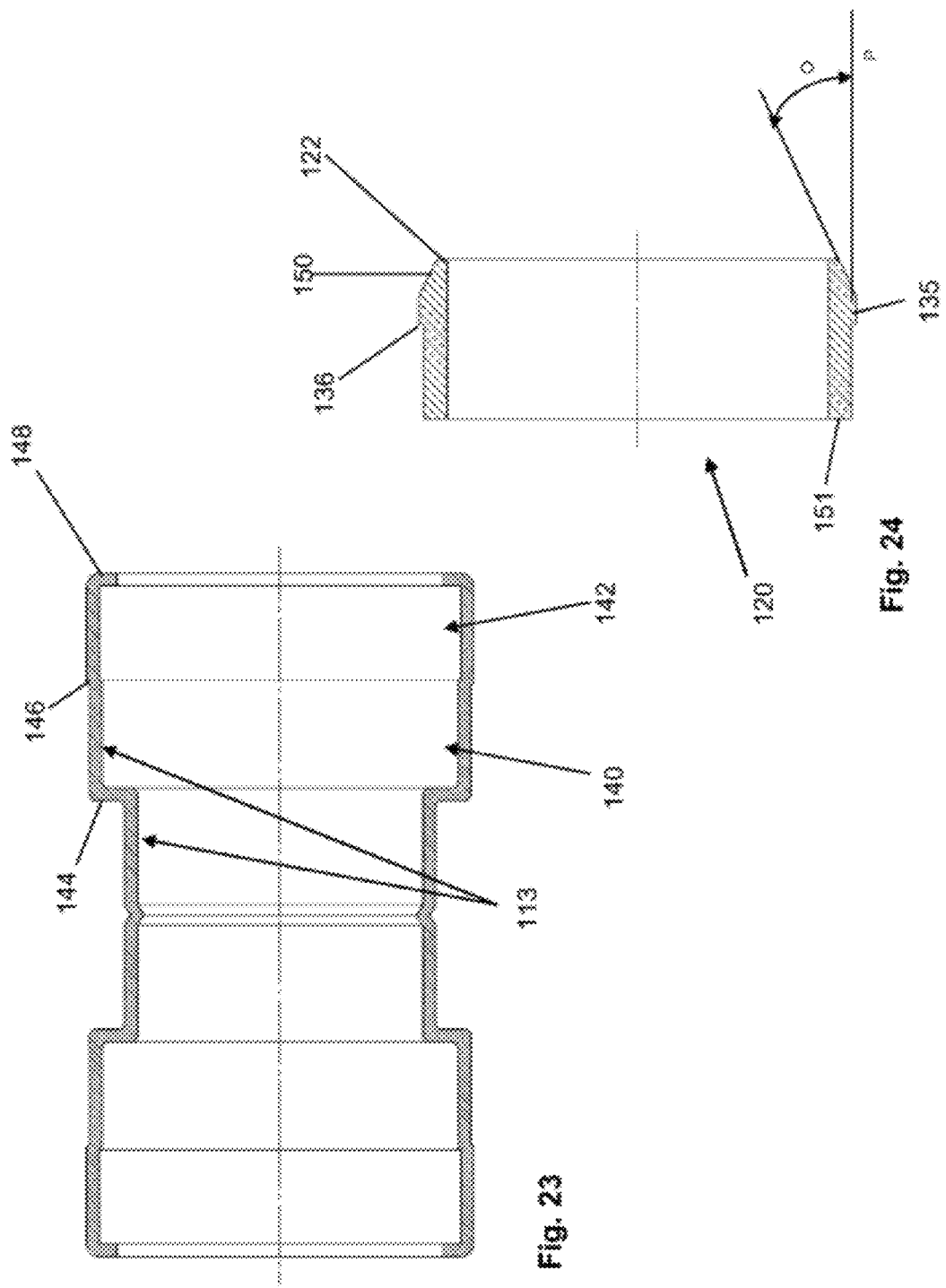

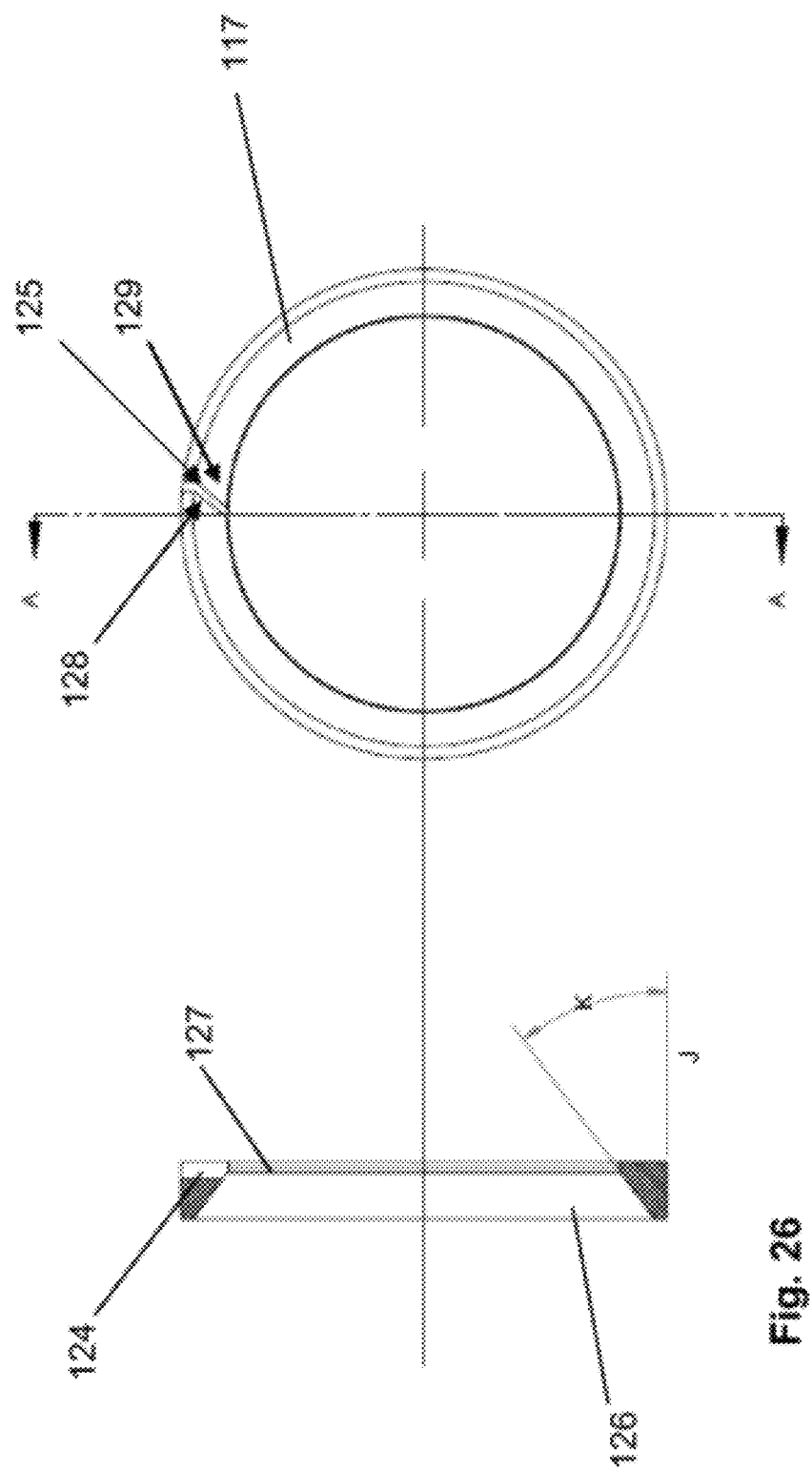

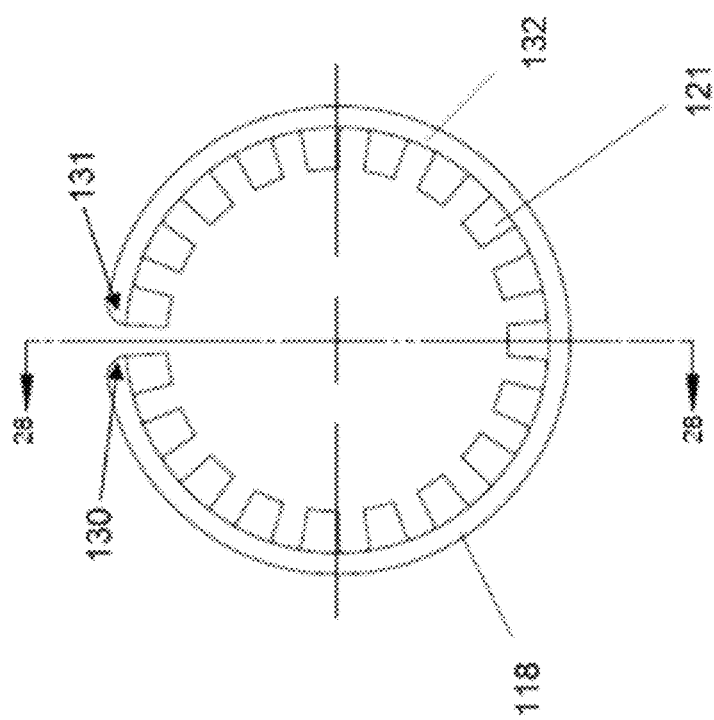
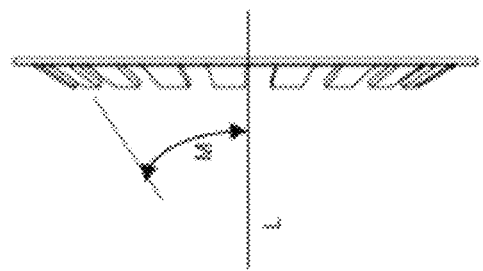

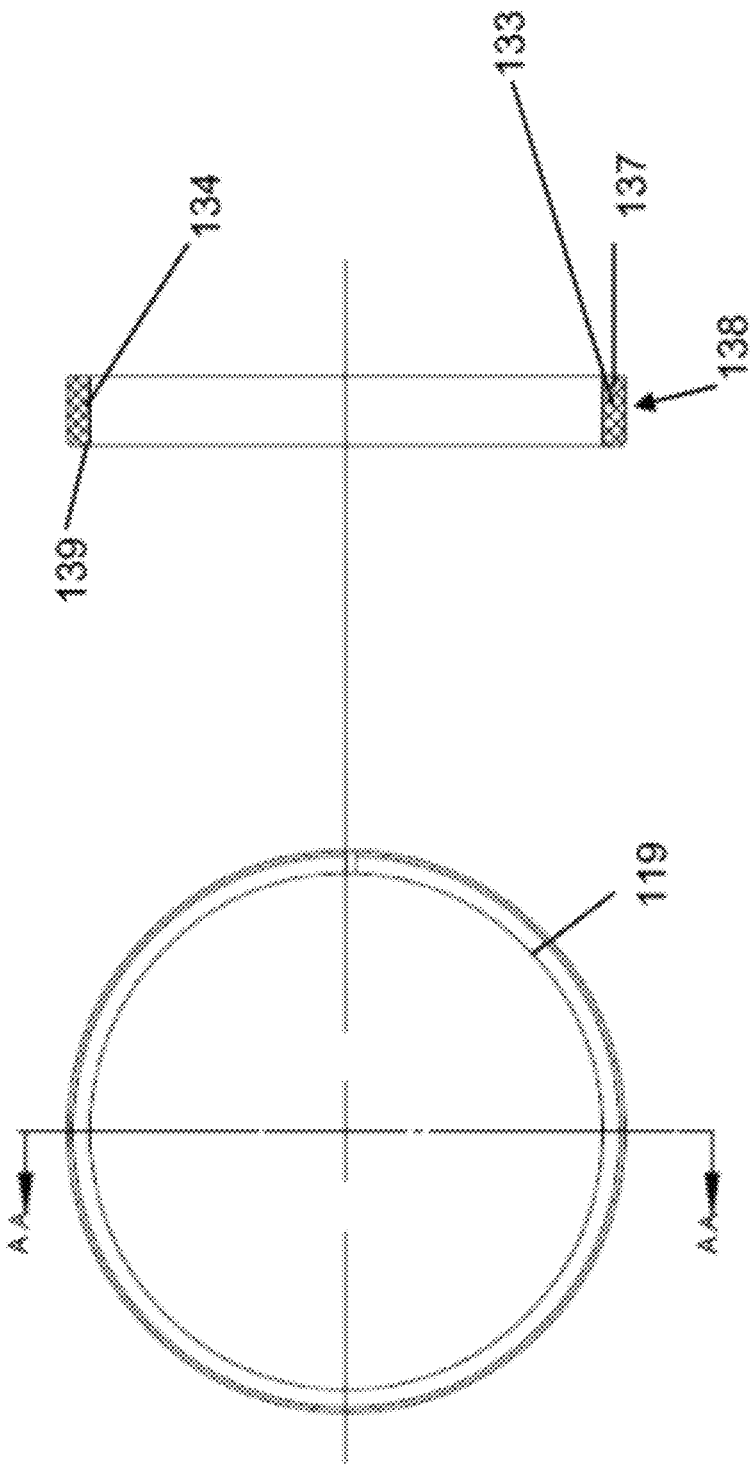

PUSH CONNECT JOINT ASSEMBLY, SYSTEM AND METHOD

REFERENCE TO RELATED APPLICATIONS

This application claims the benefit of U.S. provisional application Ser. No. 61/473,418, filed Apr. 8, 2011 and entitled "Piping Joint Assembly, System and Method", and is a continuation-in-part of U.S. application Ser. No. 12/981,855, filed Dec. 30, 2010, now U.S. Pat. No. 8,210,576, entitled "Piping joint Assembly, System and Method", the disclosures of which are incorporated herein by reference.

FIELD OF THE INVENTION

The present invention relates to fluid flow systems, and more particularly to a push-fit joint assembly, system and method that facilitates the repair and re-use of piping and tubing system parts without coining or threaded end caps.

BACKGROUND OF THE PRESENT INVENTION

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can he deployed through piping systems. Tubing and piping types can include, for example, copper, stainless steel, CPVC; (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can he time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of East Providence, R.I., USA, suppliers of the CoPro® line of push fittings and related products. Also, such technology is described, for example, in U.S. Pat. No. 7,862,089, the disclosure of which is incorporated herein by reference in its entirety.

In past pipe coupling technology, the fastening ring is inserted into the fitting body along with a plastic grip ring support that typically fails under extensive tensile testing. Further, the coupling must then be either coin rolled, glued or receive a threaded cap member to retain the fastening ring inside the fitting body. In addition to the added steps for the manufacture and assembly of the coupling, the strength of the plumbing joint is determined by the retaining cap member. The additional steps and components add significant labor and manufacturing costs to the final product cost and reduce the overall production capability due to the extensive time required for proper assembly.

In addition to the above, when using a threaded retaining cap method, the process of cutting threads into the fitting body and the retaining cap elevates the cost of machining the fitting components. Further, the threaded end cap method requires mechanical assembly as well as the added cost and application of a thread sealant to the threads. In prior efforts that employ a coined retaining cap method, the process of coining the fitting body as the retaining cap significantly increases the cost of final assembly of the fitting. Additionally, the coining process permanently encapsulates the fastening ring inside the fitting, whereby the fastening ring cannot be removed without complete destruction of the ring and fitting.

Along with additional assembly steps and increased manufacturing costs, past pipe fittings and connection methods do not allow repair for various reasons. In some cases, this is because they are factory sealed, for example. In other cases, it is because the separation of the fitting from the pipe can damage or induce wear on the parts. For example, some push-to-connect fittings provide permanently fixed demounting rings for removing the fittings. The demounting rings can be depressed axially to lift the fastening ring teeth off of the surface of the inserted pipe, such that the pipe can then be withdrawn. This arrangement, however, can subject the fittings to tampering and shorter life. In addition, while fastening ring devices work effectively as an opposing retaining member, their functionality makes them nearly impossible to dismount, remove or detach for re-use. The fastening rings are thus permanently affixed unless they are cut and removed, which then destroys the fastening ring.

Whether connected by traditional soldering methods or with push-fit methods, past efforts have been specifically provided for the connection of like materials and lack the ability to connect two unlike materials, such as copper with CPVC, HEX or stainless steel, or any other combination of unlike materials. Past methods further invariably require the replacement of fittings and valves, and do not allow re-use of the fittings or valves in instances where only a small internal component needs to be repaired or replaced.

SUMMARY OF THE PRESENT INVENTION

The present invention provides, in part, a push fitting assembly package that facilitates the re-use of push fittings without damage to the fitting elements or the pipe. The present invention connects piping using no tools, clamps, solder or glues, while creating a leak-free seal at the connected joining area. Further, unlike prior methods, the present invention can join both like and unlike piping elements in any combination, and without coining or threading the elements into place.

The quick connection pipe joint assembly package provided as part of the present invention employs a one-piece retaining ring and pusher that, when removed, exposes the clamping, sealing and fastening mechanisms of the fitting. The retaining ring and pusher member ("release pusher" for purposes of this disclosure) moves axially and can push the fastening ring of the present invention in order to facilitate the release of a cylindrical object such as a piping element held within the fitting.

For purposes of the present disclosure, a fitting (also referred to as a body member) can encompass a valve member and other piping elements including, but not limited to: a coupling joint, an elbow joint, a tee joint, a stop end, a ball valve member, tubing and other objects having cylindrical openings. In one embodiment of the present invention, one or more sealing member gasket inserts (e.g., O-ring members) fits within a first radial housing element defined in the interior wall of the fitting. In addition, at each pipe receiving end of the fitting, a second radial housing element is machined into the interior wall to retain the edges of the fastening ring. The interior housing elements provide integrated support for the sealing members and fastening ring when opposing force is applied to piping elements that have been inserted into the fitting. In one embodiment, a flexible metal support snap ring gland member is employed to provide additional support for the fastening ring.

One aspect of the present invention provides a novel push fitting joint packaging arrangement comprising a split fastening ring and a split o-ring support member. The split fastening ring can include a first and a second circumferential end point that do not connect, wherein the first and second end points include facing edges, and wherein the facing edges extend substantially radially outwardly along respective radial axes of the ring. The split o-ring support member can include a first and a second circumferential end point that do not connect, wherein the first and second end points include facing edges, and wherein the facing edges are not aligned with respective radial axes of the support member. The present invention can further comprise a split spacer member between the split o-ring support member and the split fastening ring. The split spacer member can be a separate member from the fastening ring, or can be integrated with the split fastening ring so as to form a crown-like member, In one aspect of the present invention, once the fastening ring is inserted into the fitting, the fastening ring does not require any additional method or device to retain it under opposing force. The integrated radial housing element provides for a more stable fastening ring connection with the ability to withstand significantly higher tensile pulling forces than the prior art. As a result, the stability of the quick fitting fastening connection is not determined or co-dependent on a plastic retainer, threaded end cap or machined coined retainer.

The release pusher provided as part of the present invention is primarily employed to facilitate the release of tubing, piping and other cylindrical objects inserted into a fitting. The release pusher is manually pushed into the fitting body and tapered edges of the release pusher generally or nearly abut the installed fastening ring. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed,

BRIEF DESCRIPTION OF THE DRAWINGS

FIG. 1 is an exploded front perspective view of one embodiment of a piping joint assembly package in accordance with the present invention.

FIG. 2 is an exploded front perspective cross-sectional view of the piping joint assembly package of FIG. 1.

FIG. 3 is a front cross-sectional view of a portion of the present invention according to FIG. 1, FIG. 4 is a detailed cross-sectional view of encircled portion 4-4 of FIG. 3.

FIG. 5 is a cross-sectional view of one embodiment of the fitting of the present invention.

FIGS. 6 and 7 are detailed cross-sectional views of encircled portions 6-6 and 7-7 of FIG. 5, respectively.

FIG. 9 is a left side view of one embodiment of the fastening ring of the present invention.

FIG. 10 is a front view of the fastening ring of FIG. 9.

FIG. 11 is a right side cross-sectional view of the fastening ring taken along line 11-11 of FIG. 10.

FIG. 13 is a front cross-sectional view of a portion of the present invention according to FIG. 12, FIG. 14 is a detailed cross-sectional view of encircled portion 14-14 of FIG. 13.

FIG. 15 is a cross-sectional view of one embodiment of the fitting of the present invention.

FIG. 16 is a detailed cross-sectional view of encircled portions 16-16 of FIG. 15.

FIG. 21 is a front cross-sectional view of a portion of the present invention according to FIG. 19.

FIG. 22 is a detailed cross-sectional view of encircled portion 22-22 of FIG. 21.

FIG. 23 is a cross-sectional view of one embodiment of the fitting of the present invention.

FIG. 24 is a cross-sectional view of one embodiment of the release pusher of the present invention.

FIG. 25 is a front view of the flexible sealing member support ring of the present invention.

FIG. 26 is a right side cross-sectional view of the sealing member support ring taken along line A-A of FIG. 25.

FIG. 27 is a left side view of one embodiment of the fastening ring of the present invention.

FIG. 28 is a front view of the fastening ring of FIG. 27.

FIG. 29 is a right side cross-sectional view of the fastening ring taken along line 28-28 of FIG. 28.

FIG. 30 is a front view of one embodiment of the spacer member in accordance with the present invention.

FIG. 31 is a right side cross-sectional view of the spacer member of FIG. 30 taken along line AA-AA of FIG. 30.

DETAILED DESCRIPTION OF THE PREFERRED EMBODIMENTS

Figure 8:
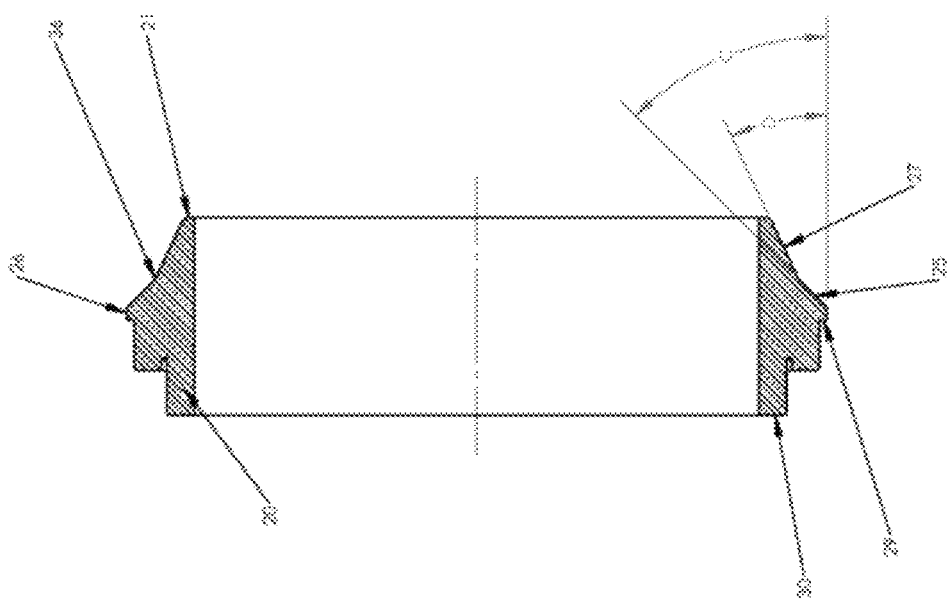
FIG. 8 is a cross-sectional view of one embodiment of the release pusher of the present invention.

In the push-fit piping joint assembly 10 as shown in FIGS. 1 and 2, elements of the joint assembly as shown include: a fitting(i.e., fitting body member) 12 having an inner wall 13 and outer wall 15, a fastening ring 18, two substantially identical sealing members 14, 16 (which can be optionally lubricated) and a release pusher 20. The fastening ring and sealing members together provide one embodiment of a packing arrangement for the present invention, and each has an internal diameter that allows for smooth and snug engagement of a piping or tubing element external surface 24. The fitting 12 is substantially hollow with a pipe receiving opening 100 therein. In one embodiment, the interior diameters of the fastening ring 18 (as measured to the teeth 19 and not the ring cylindrical base) and sealing members 14, 16 are substantially the same, and the interior diameters of the fitting 12 and the release pusher 20 are substantially the same. Further, the interior diameters of the fastening ring 18 and sealing members 14, 16 are slightly less than that of the fitting 12 and release pusher 20 so as to facilitate proper operation of the present invention. The release pusher 20 is substantially cylindrical and includes an external tip 21 at the fastening ring engaging end thereof.

In one embodiment, the fitting 12 can be forged CW617N brass, with full porting and full flow fitting, for example. The lubricant for the sealing members 14, 16 can be a food grade lubricant, for example. It will be appreciated that the sealing members can comprise a flat ring or washer-type seal member in addition or as an alternative to a circular member of substantially circular cross-section. The fastening ring 18 can comprise a spring steel formulation, for example, that enables the fastening ring to be malformed during installation, while springing back into its originally manufactured position once installed. The fastening ring is capable of grabbing an inserted pipe's surface via two or more teeth 19 to ensure connections cannot be pulled apart. The fastening ring teeth are angled downward from the substantially cylindrical perimeter of the ring, toward the fitting and away front the cap, such that when the pipe is inserted, the teeth exert a pressure against the pipe to discourage the pipe from slipping or moving back out of the fitting. No wrenches, solder, welding, glue and/or twisting and turning the elements are required to form a connection. Specifically, the combination of the fastening ring, an O-ring support member and a fastening ring crown provide a push-fit piping assembly when inserted into any cylindrical pipe.

As shown in FIGS. 3, 4 and 8, for example, the release pusher 20 includes a radially outer ledge 26, the external tip 21 and outer wall segments 25, 27. The release pusher can comprise an injection-molded plastic material or a metal material such as brass, for example. When pressure is applied on the back side 30 of the release pusher 20, the external tip 21 can engage the inside surface 32 of the fastening ring teeth 19 as will be described in more detail below, and the ledge back wall 29 can removeably engage a retaining lip 34 extending radially inwardly of the fitting inner wall 13 at the axially outermost position of the fitting, as shown in FIG. 3.

In one embodiment of the release pusher of the present invention, the outer wall segments 25, 27 comprise a single linear segment from the radially outer ledge to the external tip. In another embodiment of the present invention, as shown in FIG. 8, the first outer wall segment 25 extends linearly at a first angle C from the radially outer ledge 26 to an outer wall intermediate point 36, and the second outer wall segment 27 extends linearly from the outer wall intermediate point 36 to the external tip 21 at a second angle D.

During removal, a tool such as a specially adapted wrench, for example, can be applied to the outer top surface of the release pusher so as to exert a pushing and lifting force that causes the release pusher outer ledge to disengage the retaining lip 34. Once the release pusher is removed, the internal packing arrangement components are exposed for removal and/or replacement.

As shown in FIGS. 2 through 7, the fitting 12 is formed with first 40 and second 42 radial housing elements. The first radial housing element 40 houses sealing members 14, 16, and the second radial housing element 42 houses the fastening ring 18. The sealing members can be housed so as to substantially abut one another within the first radial housing element 40. Further, the sealing members 14, 16 are shown axially inward of the fastening ring 18, when in position within the fitting 12. In the embodiment shown in FIGS. 12 through 14, the second radial housing element 42 also houses a support snap ring gland member 90, described in more detail below.

The first radial housing element 40 is formed by a first housing back wall segment 44, the fitting inner wall 13 and a housing separator segment 46. The second radial housing element 42 is formed by the housing separator segment 46, the fitting inner wall 13 and a second housing front wall segment 48. The inner wall 13 is not labeled within the recesses of the housing elements 40, 42. As shown in FIG. 7, the second housing front wall segment 48 has a top angled guiding surface 50, which permits sliding engagement with the fastening ring circumferential base 52 (shown in FIG. 10) when the fastening ring 18 is either being inserted or removed. The top angled guiding surface 50 of the second housing front wall segment 48 extends from the fitting inner wall 13 at an axially outer position 53 thereof to a front wall segment tip 54 at an axially inner position 55 of the fitting inner wall 13.

As shown in FIG. 6, the housing separator segment 46 has a plateau surface 58 and a front wall 60 with a front tip 62. The housing separator segment also includes a top angled backing surface 64 that extends from the front wall tip 62 to the plateau surface 58. In one embodiment of the present invention, the distance E from the fitting inner wall 13 to the separator segment front tip 62 is approximately the same as the distance from the fitting inner wall 13 to the second housing front wall segment tip 54. In another embodiment of the present invention, as shown in FIG. 5, the distance E from the fitting inner wall 13 to the separator segment front tip 62 is less than the distance from the fitting inner wall 13 to the second housing front wall segment tip 54. This distance E can be changed as necessary to facilitate engagement and movement of the fastening ring 18 within the second radial housing element, as desired. As shown in FIG. 7, the top angled guiding surface 50 of the second housing front wall segment 48 can extend at an angle A measured from the fitting inner wall. Further, as shown in FIG. 6, the top angled backing surface 64 can extend at an angle B measured from the fitting inner wall. In one embodiment of the present invention, angles A and B are substantially the same. In one embodiment of the present invention, angle B can range from approximately 9 degrees to approximately 52 degrees, and angle A can range from approximately 6.5 degrees to approximately 50 degrees. Further, in one embodiment of the present invention, angle B is greater than angle D of the release pusher 20 (see FIG. 8) so as to facilitate proper operation of the present invention as described below.

As shown in FIGS. 1 and 9 through 11, the fastening ring 18 can be a split ring member having a circumferential base 52 and two circumferential end points 66 that do not connect. The fastening ring can further include fixture points 68 for handling and compressing the fastening ring. In one embodiment of the present invention, the fixture points 68 are provided at the split end so that a tool designed to hold the fastening ring at the fixture points can more easily handle and compress the fastening ring in order to assist with assembly or disassembly. For example, as shown in FIG. 10, a first fixture point 68 can be included on the left edge of a first tooth that extends from the circumferential base 52, such that the right edge of the first tooth is flush with the first circumferential end point 66. A second fixture point 68 can be included on the right edge of a second tooth that extends from the circumferential base 52, such that the left edge of the second tooth is flush with the second circumferential end point 66. Once compressed, the fastening ring is easily insertable into the second radial housing element 42 of the fitting 12 by releasing the hold on the fixture points 68, thereby allowing the fastening ring to expand such that the circumferential base engages the walls of the second radial housing element. The fastening cart be removed from the second radial housing element in similar manner. No wrenches, solder, welding, glue and/or twisting and turning the elements are required to form or disengage a connection.

The fastening ring 18 includes a substantially cylindrical base 52 that has a plurality of bifurcated or square edged teeth 19 extending inwardly from and along the base of the ring 52. As shown in FIG. 9, the teeth 19 of the fastening ring 18 can extend at an angle F from the horizontal axis G, wherein F ranges from approximately 39 degrees to approximately 68 degrees. In one embodiment of the present invention, angle F is approximately 56 degrees. These angles are measured when the teeth are at rest position and are not stressed by the insertion of a pipe. In one embodiment, each tooth has a substantially squared off edge, comprising a left edge, a right edge and a bottom edge. The top edge of each tooth is integrally connected to the circumferential base 52 of the fastening ring 18. The number of teeth can readily vary in number and size.

In operation, the fitting 12 of the present invention is provided and one or more sealing members 14, 16 are inserted into the first radial housing element 40, as shown in FIG. 3. Next, the fastening ring 18 is inserted into the second radial housing element 42, and release pusher 20 is snapped into engagement with the retaining lip 34 of the fitting 12. When a pipe 70 is inserted, it travels through the release pusher 20 into the pipe receiving cavity 100 of the fitting 12, engaging the fastening ring 18 and the one or more sealing members 14, 16. The sealing members provide a strong, leak-free seal and the fastening ring prohibits any inclination the pipe may have to slide out of position adjacent the pipe end point lip 71 (see FIG. 3) inside the pipe fitting 12.

Figure 12:
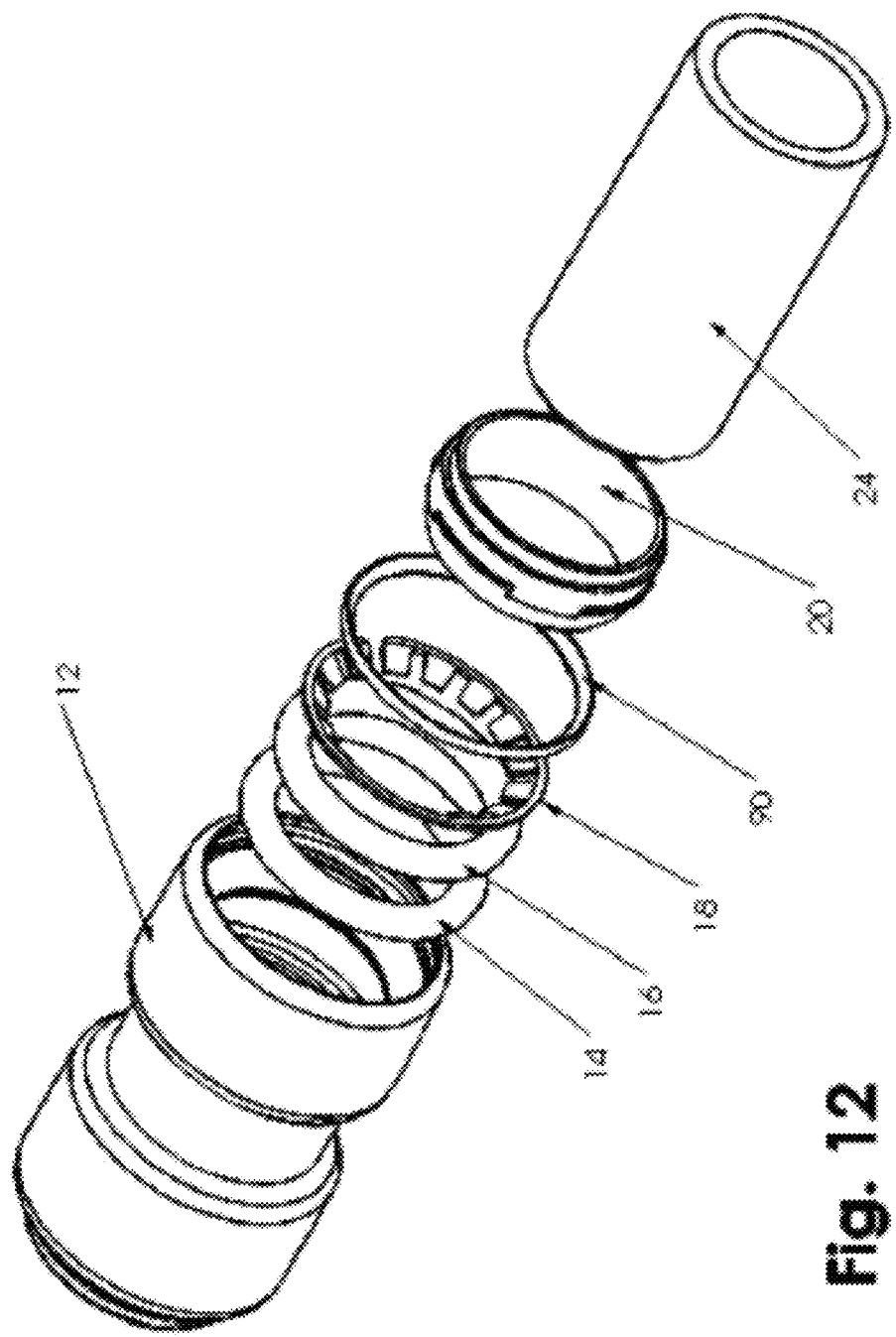
FIG. 12 is an exploded front perspective view of an alternative embodiment of the piping joint assembly package of the present invention.
Figure 17:
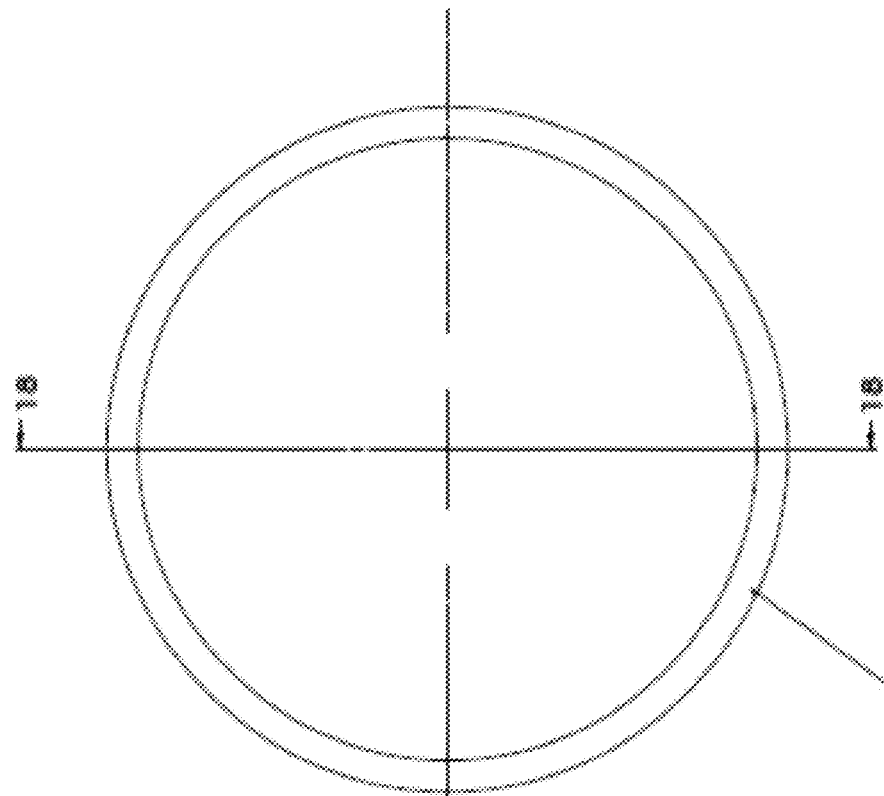
FIG. 17 is a front view of the flexible support snap ring gland member of the present invention.
Figure 18:
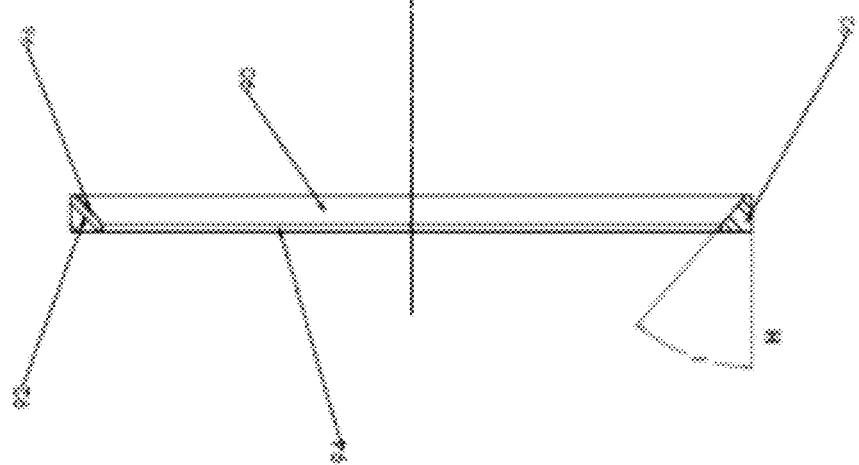
FIG. 18 is a right side cross-sectional view of the snap ring gland member taken along line 18-18 of FIG. 17.

FIGS. 12-18 illustrate an alternative embodiment of the present invention. In this embodiment, the first radial housing element 40 of the fitting 12 is substantially the same as described above. Further, as shown in FIG. 12, the fitting 12, sealing members 14, 16, release pusher 20 and fastening ring 18 are similarly present. However, the second radial housing element 42 includes a front wall segment 72 that does not have a top angled guiding surface. Rather, the front wall segment 72 of the second radial housing element 42 extends radially outwardly and into the fitting inner wall 13. As such, the second radial housing element 42 includes the inner wall surface. 13 for engaging the circumferential base 52 of the fastening ring 18, as well as a surface 74 for engaging the circumferential base 92 of a snap ring 90. Surface 75 provides a guiding surface for the release pusher 20 as it is pushed axially inwardly of the fitting in order to depress the fastening ring teeth so as to allow removal of an inserted pipe member, for example. As shown in FIGS. 17 and 18, the snap ring 90 includes a fastening ring-engaging surface 94 and a release pusher engaging surface 96, and is positioned in place in the fitting when the release pusher 20 is snapped or popped into engagement with the retaining lip 34 of the fitting 12. The snap ring 90 can comprise a spring steel formulation. Further, circumferential base 92 can extend from the horizontal axis H of the snap ring 90 at an angle I of between approximately 6.5 degrees and approximately 50 degrees. In a particular embodiment of the present invention, angle I is approximately 40 degrees.

While the fastening ring 18 is shown in FIG. 12 as being a split ring, the fastening ring in this embodiment of the present invention can also be an integral ring that is not split. As such, and given the lower profile of the front wall segment 72 of the second radial housing element 42, the fastening ring can be more easily inserted into the second radial housing element without as much initial deformation as that associated with the embodiment of the present invention shown in FIGS. 1-5, for example.

In the embodiment of the present invention with the snap ring 90, the snap ring can be provided with a split similar to that provided in fastening ring 18 in FIG. 1. After placing the fastening ring into the second radial housing element, the support snap ring gland 90 can be compressed with a tool using fixture points (not shown) similar to that shown for the fastening ring 18 of FIG. 10, and then positioned within the second radial housing element 42. The compression of the supporting snap ring gland is released, and the ring returns to its original manufactured size, thereby acting to retain the fastening ring in position. Next, the release pusher 20 can be pushed into place such that the ledge back wall 29 removably engages the lip member 34 of the fitting 12.

Figure 19:
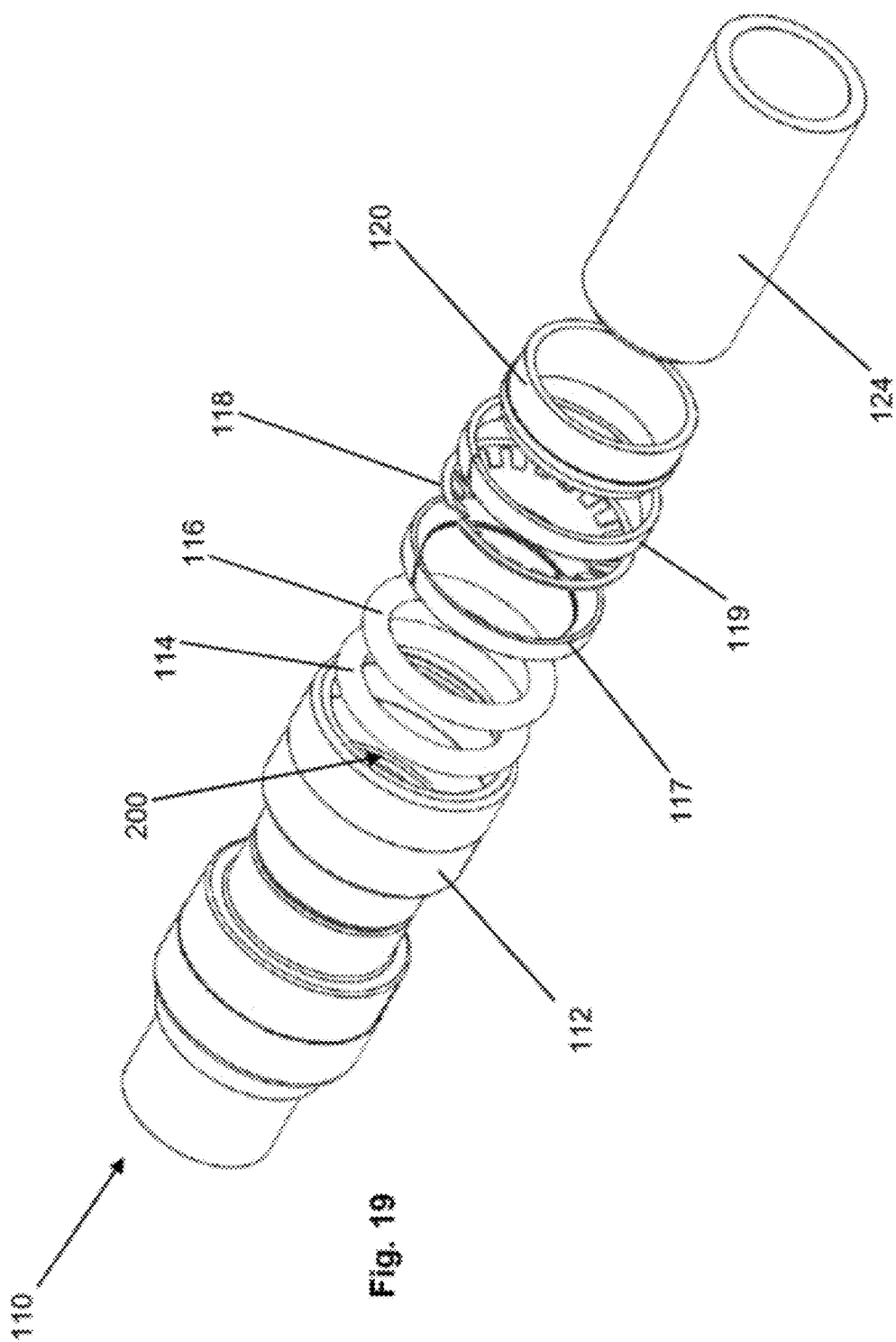
FIG. 19 is an exploded front perspective view of the piping joint assembly package of the present invention including one embodiment of a split grip ring assembly package.
Figure 20:
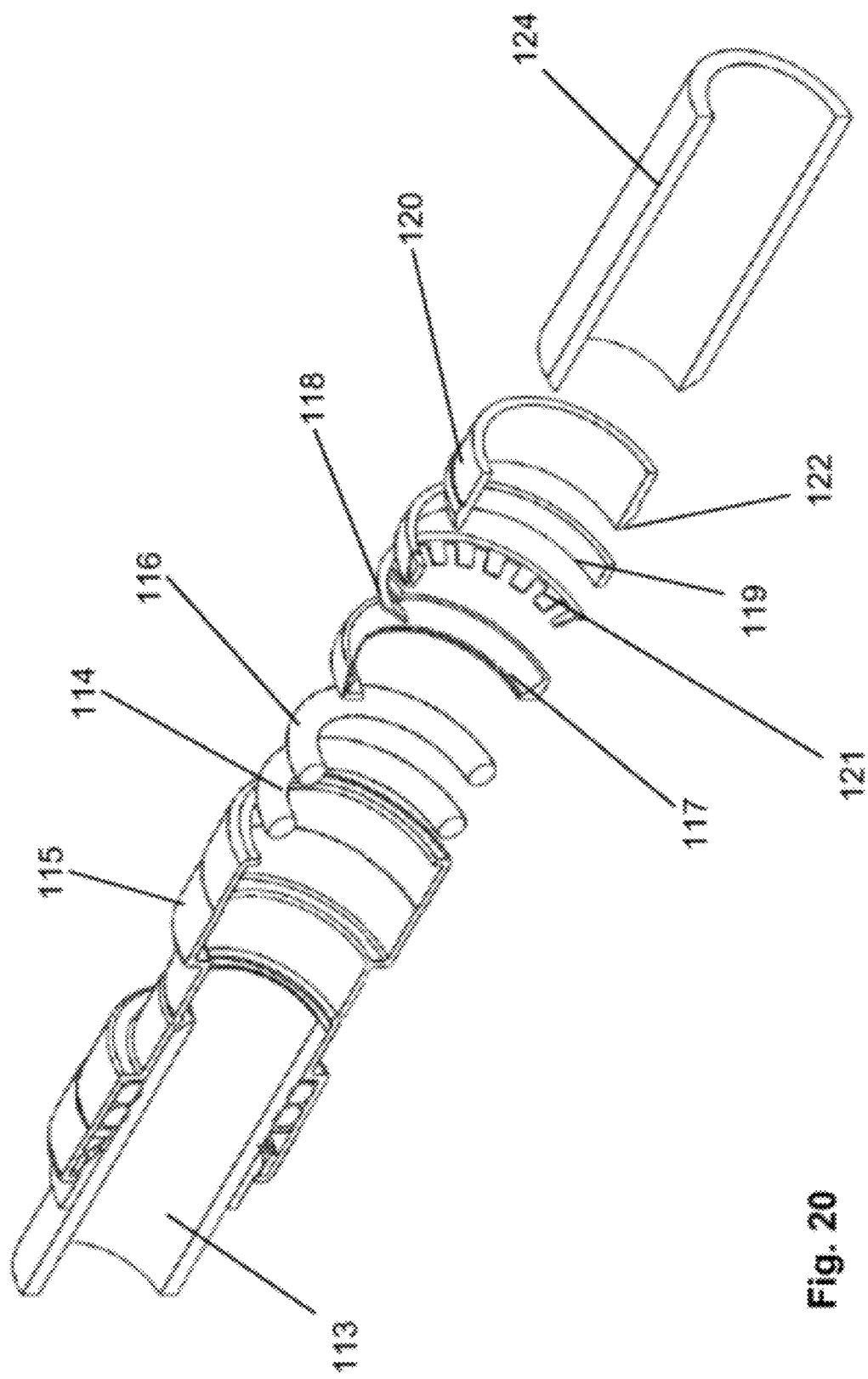
FIG. 20 is an exploded front perspective cross-sectional view of the piping joint assembly package of FIG. 19 including one embodiment of a split grip ring assembly package.

An alternative embodiment of the push connect joint assembly 110 of the present invention is illustrated in FIGS. 19-31. As shown in FIGS. 19 and 20, elements of the joint assembly as shown include: a fitting (i.e., fitting body member) 112 having an inner wall 113 and outer wall 115, a fastening ring 118, two substantially identical sealing members 114, 116 (which can be optionally lubricated), a sealing member support ring 117, a spacer member 119 and a release pusher member (also referred to as a release pusher or a release push cap) 120. The sealing member support ring and fastening ring together provide one embodiment of a packing arrangement for the present invention, and each has an internal diameter that allows for smooth and snug engagement of a piping or tubing element external surface 124. The fitting 112 is substantially hollow with a pipe receiving opening 200 therein.

As shown in FIGS. 20, 21 and 23, the fitting 112 is formed with a first radial housing element 140 to house sealing members 114 and 116 and a second radial housing element 142 to house the sealing member support ring 117, the fastening ring 118 and the spacer member 119. The sealing members can be housed so as to substantially abut one another within the first radial housing element 140. The sealing member support ring 117, the fastening ring 118 and the spacer member 119 can be housed so as to substantially abut one another within the second radial housing element 142. The sealing member support ring 117 and O-ring member 116 can abut one another when installed, or there can be a slight gap in between these members when installed.

The first radial housing element 140 is formed by a first housing back wall segment 144, the fitting inner wall 113 and a housing separator segment 146. The second radial housing element 142 is formed by the housing separator segment 146, the fitting inner wall 113 and a housing front wall segment 148. In one embodiment, the radius of the second radial housing element 142 is slightly larger than the radius of the first radial housing element 140.

In one embodiment, the interior diameters of the sealing member support ring 117, fastening ring 118 (as measured to the teeth 121 and not the ring cylindrical base), spacer member 119 and sealing members 114, 116 are substantially the same, and the interior diameters of the fitting 112 and the release pusher 120 are substantially the same. Further, the interior diameters of the sealing member support ring 117, fastening ring 118, spacer member 119 and sealing members 114, 116 are slightly less than that of the fitting 112 and release pusher 120 so as to facilitate proper operation of the present invention.

As shown in FIGS. 19 through 22 and 25 through 26, the sealing member support ring or member 117 has a circumferential base 124, a sealing member-engaging surface 127 and a fastening ring-engaging surface 126. Further, circumferential base 124 can extend from the horizontal axis J of the sealing member support ring 117 at an angle K of between approximately 6.5 degrees and approximately 50 degrees. In a particular embodiment of the present invention, angle K is approximately 37 degrees. In one embodiment of the present invention, the sealing member support ring 117 includes a first circumferential end point 128 and a second circumferential end point 129 that do not connect and thereby form a slit 125. Each of the first and second end points 128, 129 includes a facing edge, and each facing edge is not aligned with the radial axes of the support member. For instance, line A-A in FIG. 28 shows radial axes of the support member 117, and this line does not extend through or otherwise align with the facing edges of the end points 128, 129 of the support ring member 117. In an alternative embodiment, the end points 128 and 129 can include facing edges that are aligned with radial axes of the sealing member support ring 117. The slit 125 allows the sealing member support ring 117 to be manually pinched and compressed. When compressed, one circumferential end point can overlap the second circumferential end point so that the sealing member support ring can be easily inserted into a fitting. The overlapping capability is facilitated by the facing edges of the end points 128, 129 being unaligned with radial axes of the support member.

As shown in FIGS. 19 and 27 through 29, the fastening ring 118 can be a split ring member having a circumferential base 132 and two circumferential end points 130 and 131 that do not connect. The gap formed between the non-connecting circumferential end points 130, 131 allows for the fastening ring to be easily compressed for insertion into a fitting. As shown in FIG. 28, the first 130 and second 131 end points include facing edges that extend substantially radially outwardly along respective radial axes of the ring. Line 28-28 illustrates different axes extending radially outwardly from the center axis of the fastening ring. The arrangement of the end points 130, 131 and their facing edges as shown facilitates ease of operability while maintaining overall strength of the fastening ring 118.

The fastening ring can further include fixture points for handling and compressing the fastening ring. In one embodiment of the present invention, the fixture points are provided at the split end so that a tool designed to hold the fastening ring at the fixture points can more easily handle and compress the fastening ring in order to assist with assembly or disassembly. Once compressed, the fastening ring is easily insertable into the second radial housing element 142 of the fitting 112 by releasing the compression hold on the fastening ring, thereby allowing the fastening ring to expand such that the circumferential base engages the walls of the second radial housing element. The fastening ring can be removed from the second radial housing element in reverse manner. In one embodiment of the present invention, the split fastening ring 118 has a diameter that exceeds the diameter of the split sealing member support ring 117. No wrenches, solder, welding, glue and/or twisting and turning the elements are required to form or disengage a connection.

As further shown in FIGS. 19 and 27 through 29, the fastening ring 118 includes a substantially cylindrical base 132 that has a plurality of bifurcated or square edged teeth 121 extending inwardly from and along the base of the ring 132. As shown in FIG. 27, the teeth 121 of the fastening ring 118 can extend at an angle M from the horizontal axis L, wherein M ranges from approximately 39 degrees to approximately 68 degrees. In one embodiment of the present invention, angle M is approximately 56 degrees. These angles are measured when the teeth are at rest position and are not stressed by the insertion of a pipe. In one embodiment, each tooth has a squared-off outer edge comprising a left edge, a right edge and a bottom edge. The top edge of each tooth is integrally connected to the circumferential base 132 of the fastening ring 118. The number of teeth can readily vary in number and size.

As shown in FIGS. 19 and 30 through 31, the packing arrangement may further include a spacer member 119. The spacer member is substantially cylindrical in shape and includes a circumferential base 133, a fastening ring-receiving end 137, an exterior surface 138, an interior surface 134 and a top end 139. Furthermore, the spacer member can be a split ring member having a circumferential base 133 and two circumferential end points that do not connect, similar to that of the fastening ring 118 shown in FIG. 28, for example. The gap formed between the non-connecting circumferential end points allows for the spacer member to be easily compressed for insertion into a fitting. As shown in FIGS. 21 and 22, once inserted into the second radial housing member 142, the exterior surface 138 of the spacer member 119 is flush with the fitting interior wall 113 and the fastening ring-receiving end 137 is flush with the circumferential base 132 of the fastening ring 118. Furthermore, the top end 130 of the spacer member 119 is adjacent to and flush with the housing front wall segment 148 of the second radial housing element 142 (see FIG. 23). The spacer member 119 can comprise a spring steel formulation in one embodiment of the present invention.

Further, the spacer member may be a separate piece as shown in FIG. 19, or it may be integrated with the fastening ring such that these two elements form a single, monolithic piece in the fitting packing arrangement. When the spacer member is integrated into the fastening ring 118, it forms a fastening ring crown that operates similarly to the spacer member.

The release pusher 120 is substantially cylindrical and hollow and includes an external tip 122 at the fastening ring engaging end thereof, as shown in FIG. 24. The release pusher 120 also includes a radially outer ledge segment 135, a ledge back wall 136, and a second outer wall segment 150. The pusher can comprise an injection-molded plastic or a metal material such as brass, for example. When pressure is applied on the back side 151 of the release pusher 120, the external tip 122 can engage the inside surface of the fastening ring teeth 121 and the ledge back wall 136 can removeably engage the housing front wall segment 148, as shown in FIG. 22. Once the release pusher 120 is inserted into the fitting 112, the radially outer ledge segment 135 provides for flush engagement with the interior surface 134 of the spacer member 119. The diameter of the release pusher 120, as measure to the exterior surface of the radially outer ledge segment 135, can be slightly less than the diameter of the spacer member 119, as measured to the interior surface 134, in one embodiment of the present invention.

In one embodiment of the release pusher of the present invention, the second outer wall segment 150 comprises a linear segment front the radially outer ledge segment 135 to the external tip 122. As shown in FIG. 24, the second outer wall segment 150 extends linearly at a first angle O from the horizontal axis P to the external tip 122. The angle ranges from approximately 8 degrees to approximately 73 degrees.

In operation, the fitting 112 of the present invention is provided and one or more sealing members 114, 116 are inserted into the first radial housing element 140, as shown in FIG. 21. Next, the sealing member support ring 117, the fastening ring 118 and the spacer member 119 are inserted into the second radial housing element 142, and release pusher 120 is snapped into engagement with fitting 112. When a pipe 70 is inserted, it travels through the release pusher 120 into the pipe receiving cavity 200 of the fitting 112, engaging the fastening ring 118 and the one or more sealing members 114, 116. The sealing members provide a strong, leak-free seal and the combination of the sealing member support ring 117, the fastening ring 118 and the spacer member 119 prohibits any inclination the pipe may have to slide out of position.

The angles described herein will be understood to be exemplary and provided as embodiments associated with proper working operation of the present invention. For example, the angles of the top surfaces of members 46 and 48 contribute to the stability of the present invention as well as the easy manipulation of its component parts. Further, it will be appreciated that, in one embodiment of the present invention, the members of the push connect joint assembly are formed through hydroforming processes.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A push fitting joint packing arrangement, comprising:
   at least one o-ring member;
   a split o-ring support member immediately adjacent the o-ring member;
   a split fastening ring immediately adjacent the split o-ring support member, wherein the split fastening ring has first and second faces, and wherein the o-ring support member is immediately adjacent the first face of the split fastening ring; and
   a split spacer member abutting the second face of the split fastening ring.

2. The arrangement of claim 1, wherein the split fastening ring includes a substantially cylindrical-shaped support base having an interior and an exterior side, and a plurality of teeth extending from and along the interior side of the support base.

3. The arrangement of claim 1, wherein the split fastening ring includes a first and a second circumferential end point that do not connect, wherein the first and second end points include facing edges, and wherein the facing edges extend substantially radially outwardly along respective radial axes of the ring.

4. The arrangement of claim 1, wherein the split o-ring support member includes a first and a second circumferential end point that do not connect, wherein the first and second end points include facing edges, and wherein the facing edges are not aligned with respective radial axes of the support member.

5. The arrangement of claim 1, wherein the at least one o-ring member includes two o-ring members.

6. The arrangement of claim 1, wherein the split spacer member is integrated with the split fastening ring to form a single monolithic member.

7. The arrangement of claim 1, wherein the split fastening ring has a diameter that exceeds the diameter of the split o-ring support member.

8. The arrangement of claim 1, further including a push release cap.

9. A method of enabling a fitting to receive a pipe through push connection, comprising:
   providing a fitting;
   inserting at least one o-ring member into the fitting;
   inserting a split o-ring support member into the fitting such that the o-ring support member is immediately adjacent the at least one o-ring member;
   inserting a split fastening ring into the fitting, wherein the split fastening ring has first and second faces, and wherein the o-ring support member is inserted so as to be immediately adjacent the first face of the split fastening ring; and
   inserting a split spacer member after inserting the split fastening ring such that the split spacer member is immediately adjacent the split fastening ring.

10. The method of claim 9, wherein the split fastening ring includes a substantially cylindrical-shaped support base having an interior and an exterior side, and a plurality of teeth extending from and along the interior side of the support base.

11. The method of claim 9, wherein the split fastening ring includes a first and a second circumferential end point that do not connect, wherein the first and second end points include facing edges, and wherein the facing edges extend substantially radially outwardly along respective radial axes of the ring.

12. The method of claim 9, wherein the split o-ring support member includes a first and a second circumferential end point that do not connect, wherein the first and second end points include facing edges, and wherein the facing edges are not aligned with respective radial axes of the support member.

13. The method of claim 9, wherein the step of inserting at least one o-ring member into the fitting includes inserting two o-ring members.

14. The method of claim 9, wherein the split fastening ring has a diameter that exceeds the diameter of the split o-ring support member.

15. The method of claim 9, including the step of inserting a push release cap into the pipe fitting.

16. A push connect fitting arrangement, comprising:
   a fitting having an internal wall defining an internal cavity and at least two internal housing elements;
   a first housing element packing arrangement comprising at least one o-ring member and a split o-ring support member immediately adjacent the at least one o-ring member; and
   a second housing element packing arrangement comprising a split fastening ring immediately adjacent the split o-ring support member and further comprising a split spacer member.

17. The push connect fitting arrangement of claim 16, wherein the second housing element packing arrangement further comprises a push release cap.

18. A push fitting joint packing arrangement, comprising:
   a split fastening ring;
   a split o-ring support member immediately adjacent the split fastening ring; and
   a split spacer member integrally formed with the split fastening ring to form a single monolithic member.

* * * * *